United States Patent Office 3,251,875
Patented May 17, 1966

3,251,875
N-NITROSO DERIVATIVES
Henry J. Gerjovich and Jean Bradley Harrison, Wilmington, Del., assignors to E. I. du Pont de Nemours and Company, Wilmington, Del., a corporation of Delaware
No Drawing. Filed Aug. 31, 1962, Ser. No. 220,851
5 Claims. (Cl. 260—465.5)

This application is a continuation-in-part of our copending application Serial No. 107,341, filed May 3, 1961, now abandoned.

This invention relates to N-nitroso compounds and their use as plant growth regulants.

The novel compounds of this invention are represented by the following formula:

$$\text{R}-\underset{\underset{\text{NO}}{|}}{\text{N}}-\text{CH}_2-\text{CH}_2-\text{A}$$

wherein

A is

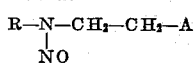

$\overset{\text{O}}{\underset{}{\|}}\text{C}-\text{X}-\text{R}_1$, CN or $\overset{\text{O}}{\underset{}{\|}}\text{C}-\text{NH}_2$ R is an unsubstituted straight chain hydrocarbon radical of less than 4 carbons, a hydroxy substituted straight chain hydrocarbon radical of less than 4 carbons or a halogen substituted straight chain hydrocarbon radical of less than 4 carbons and with the limitation that R must contain 2 or 3 carbon atoms when A is cyano;

X is oxygen or sulfur; and $R_1$ is hydrogen, alkyl of less than 7 carbons; alkali metal ion including lithium, sodium, potassium, rubidium and cesium; alkaline earth metal ion including magnesium, barium, strontium, and calcium; ammonium, monoalkylammonium, dialkylammonium, or trialkylammonium, mono(alkoxyalkyl)ammonium, di(alkoxyalkyl)ammonium, tri(alkoxyalkyl)ammonium, mono(alkoxyalkyl)-alkylammonium, or di(alkoxyalkyl)alkylammonium where alkoxyalkyl is less than 7 carbons and alkylammonium is less than 5 carbons, mono-, di- and tri-alkanol ammonium, monoalkanol-dialkyl ammonium, monoalkanol-monoalkyl ammonium, dialkanol-monoalkyl ammonium, and tetra-alkylammonium where each alkanol is 2 through 4 carbon atoms and each alkyl is 1 through 4 carbon atoms.

Specifically included within the scope of R can be mentioned straight chain alkyl of less than 4 carbons; monohydroxyalkyl of less than 4 carbons; dihydroxyalkyl of less than 4 carbons; haloalkyl of less than 4 carbons where halo includes chlorine, bromine, iodine and fluorine; allyl; haloallyl where halo includes chlorine, bromine, iodine and fluorine; propargyl and omega-halopropargyl where halo includes chlorine, bromine, iodine and fluorine.

Preferred compounds of this invention are N-nitroso-N-methyl-β-alanines and N-nitroso-N-ethyl-β-alanines of the above formula where $R_1$ is hydrogen, alkyl, sodium, monoalkylammonium, dialkylammonium, trialkylammonium, mono-, di- and tri-alkanolammonium, monoalkanol-monoalkylammonium, monoalkanol-dialkylammonium, dialkanol-monoalkylammonium and tetra-alkylammonium, where each alkyl is 1 through 4 carbon atoms and each alkanol is 2 through 4 carbon atoms.

Particularly preferred because of their outstanding effect as plant growth control agents are the compounds of the structure:

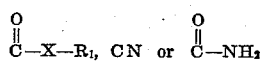

wherein
$R_1$ is hydrogen, alkyl, sodium, monoalkylammonium, dialkylammonium, trialkylammonium, mono-, di- and tri-alkanolammonium, monoalkanol - monoalkylammonium, monoalkanol-dialkylammonium, dialkanol-monoalkylammonium and tetraalkylammonium where each alkyl is 1 through 4 carbon atoms and each alkanol is 2 through 4 carbon atoms.

The compounds of this invention are conveniently prepared by several routes.

In the following equations R has the same meaning as above.

(a) NITROSATION OF THE AMINE

Where $R_1$=H and X=O and where $R_1$=alkyl and X=O or S, the nitroso compound is obtained by nitrosation of the amine.

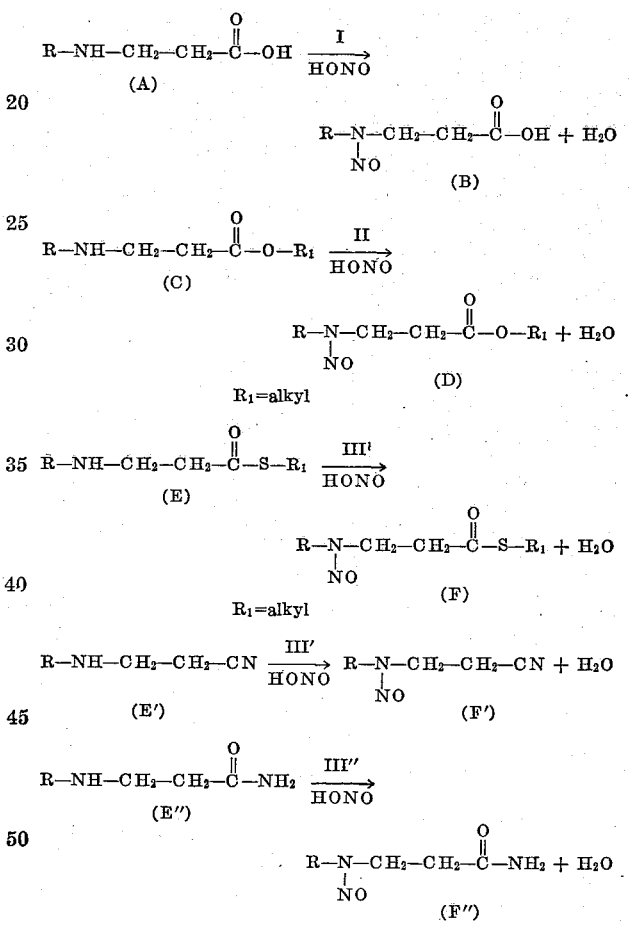

These amines A, C, E are prepared by known methods. For example, type A amines are prepared by hydrolysis of amines C.

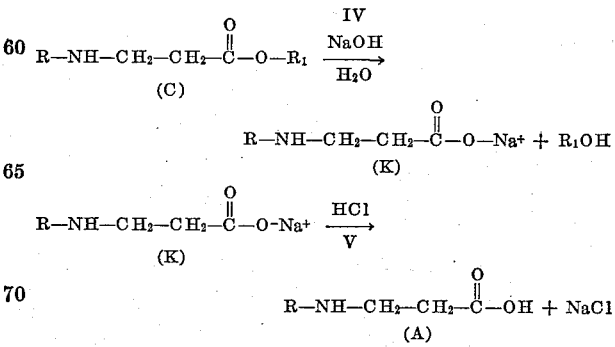

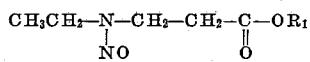

The type C amines are conveniently prepared by the addition of primary alkyl amines to the appropriate acrylic acid ester according to known methods [R. W. Holley, J. Am. Chem. Soc. 71, 2127 (1949)].

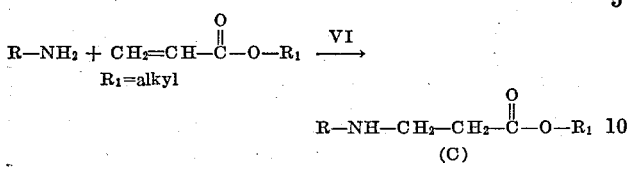

The type E amines are prepared in analogous fashion from primary alkyl amines and the appropriate thiolacrylic acid alkyl esters.

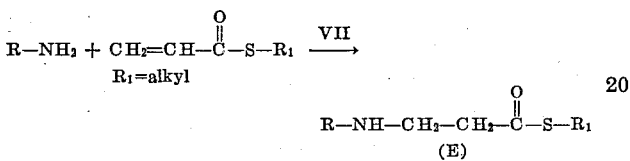

The thiolacrylic acid esters $CH_2=CH-C-S-R_1$ where $R_1=$alkyl are prepared according to known methods [G. Braude, J. Org. Chem. 22, 1675 (1957)].

The type E' amines are prepared from the primary amines and acrylonitrile according to well known literature methods ["The Chemistry of Acrylonitrile," 2nd Ed. p. 23, copyright 1959 by American Cyanamid Co.].

Partial hydrolysis of E' amines yields the E'' amides.

Compounds of the type

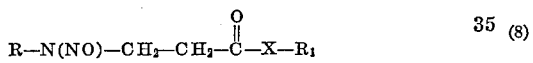

where $X=O$ and $R_1=H$ or alkyl or where $X=S$ and $R_1=$alkyl and where R contains a hydroxy or halo-substitution are made by nitrosating the corresponding amine or amine salts. These amines are prepared by known methods. Some examples of these amines and their preparation are as follows:

(1)
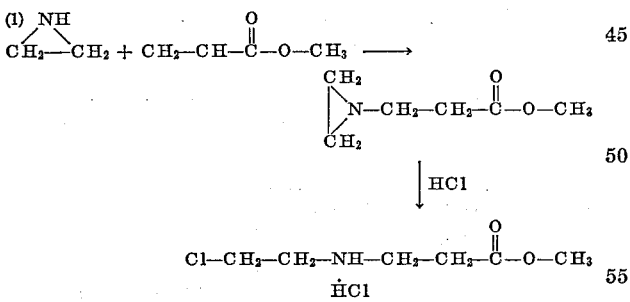

(2)
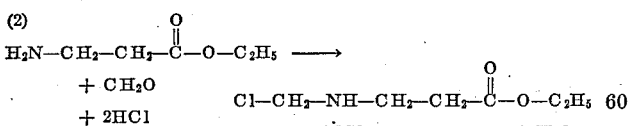

(3)
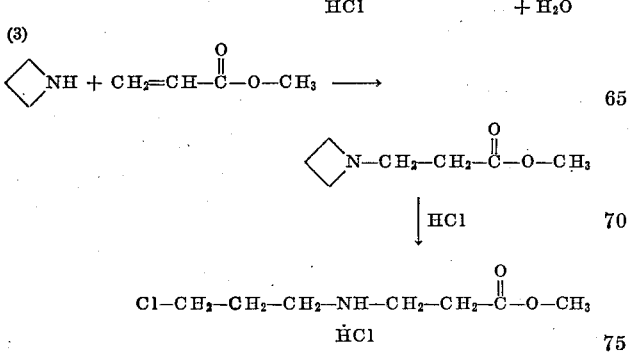

(4)
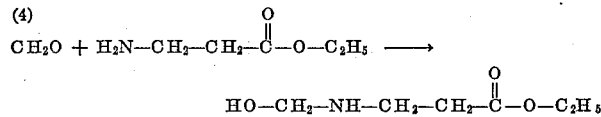

(5)
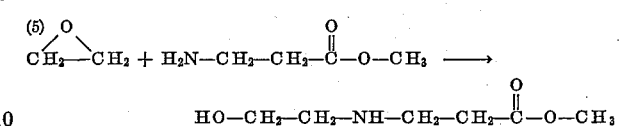

(6)
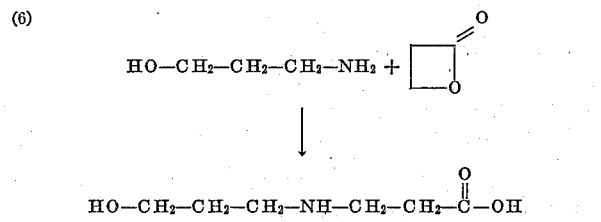

Compounds of the type

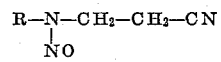

are prepared by nitrosating the corresponding amines according to reaction III'. Some examples of these amines and their preparation are as follows:

(7)
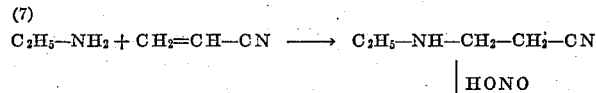

(8)
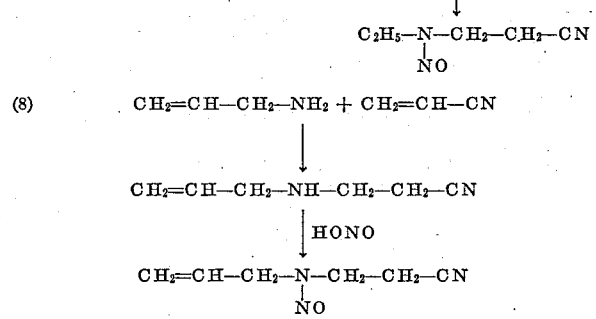

Compounds of the type

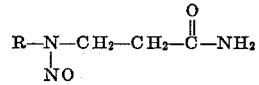

are prepared by nitrosating the corresponding amine according to reaction III''.

(9)
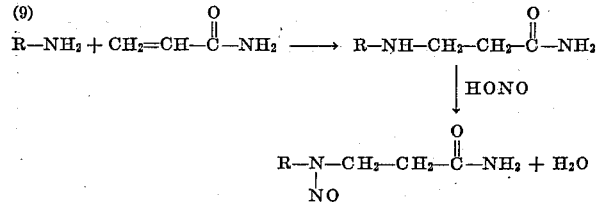

(b) NEUTRALIZATION OF THE N-NITROSO-N-ALKYL-β-ALANINE

Compounds of the type

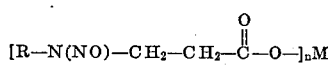

where M=ammonium ion, mono-, di-, tri-alkylammonium, alkali metal ion (lithium, sodium, potassium, rubidium, cesium), alkaline earth ion (magnesium, calcium, di(alkoxyalkyl)ammonium, tri(alkoxyalkyl)ammonium, mono(alkoxyalkyl)alkylammonium or di(alkoxyalkyl)alkylammonium where alkoxyalkyl is less than 7 carbons and alkylammonium is less than 5 carbons, mono-, di- and tri-alkanolammonium, monoalkanol-dialkylammonium, monoalkanol-monoalkylammonium, dialkanol-monoalkylammonium, and tetraalkylammonium where each alkanol is 2 through 4 carbons and each alkyl is 1 through 4 carbon atoms, and where $n=1$ or 2 to balance the valence of M are conveniently prepared by neutralization of the N-nitroso-N-alkyl-$\beta$-alanine with the appropriate base [ammonia, mono-, di- or trialkylamine, alkali hydroxide, alkaline earth hydroxide, mono(alkoxyalkyl)amine, di(alkoxyalkyl)amine, tri(alkoxyalkyl)amine, mono(alkoxyalkyl)alkylamine, di(alkoxyalkyl)alkylamine where alkoxyalkyl is less than 7 carbon atoms and alkyl is less than 5 carbons; mono-, di-, and trialkanol amines where alkanol is 2 through 4 carbon atoms; monoalkanol-dialkylamine, monoalkanol-monoalkylamine and dialkanol-monoalkylamine; tetraalkylammonium hydroxide].

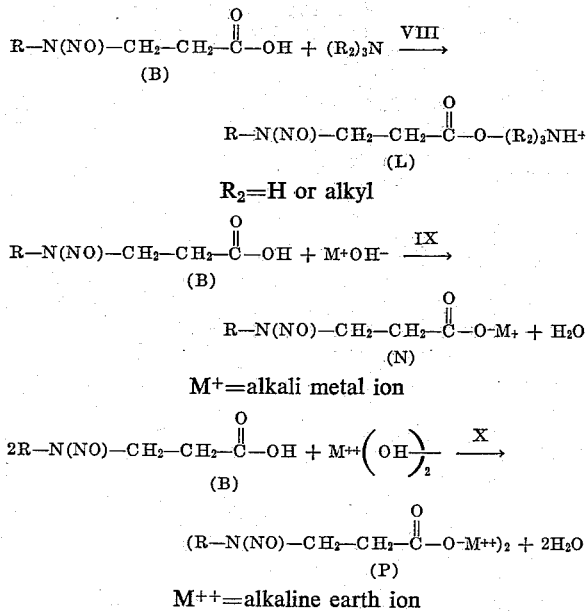

$R_2$ and $R_3$=low molecular weight alkyl
$R_4$=low molecular weight alkyl or H The conversion of dialkylamines to N-nitrosodialkylamines

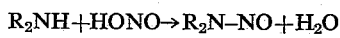

is described in the literature ["The Organic Chemistry of Nitrogen," new ed., by T. W. J. Taylor and W. Baker, The Clarendon Press (1949), pp. 59, 451; "Reactions of Organic Compounds," by W. J. Hickinbottom, Longmans Green & Company (1957), pp. 429, 430]. All the compounds of the invention are prepared by a nitrosation of a secondary amine at some stage in the route.

The N-nitroso-N-alkyl-beta-alanines are prepared according to Equation I.

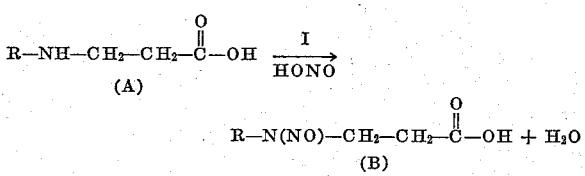

Since these N-alkyl-beta-alanines (compounds A) are generally water soluble, water is the solvent of choice for this reaction. Other solvents (lower alcohols, acetic acid) as well as solvent mixtures (alcohol/water, acetic acid/water, dioxane/water, methylene chloride/water, ethyl ether/water) can be used. The source of nitrous acid is conveniently sodium nitrite or potassium nitrite and a mineral acid (hydrochloric acid, sulfuric acid, or phosphorous acids). This generation of nitrous acid forms a salt (for example sodium chloride) as a by-product.

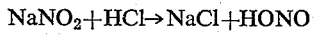

The product N-nitroso-N-alkyl-beta-alanine (compound B) has an appreciable water solubility. Saturation of an aqueous solution of B with a salt such as sodium chloride often precipitates the compound, generally as a yellow oil. If the nitrosation reaction is run under concentrated conditions such that the water solvent is nearly saturated with the by-product salt formed, then the reaction product B will often precipitate with no further added salt. The addition of an immiscible organic phase (for example methylene chloride or ethyl ether) before or after the reaction will aid in extracting the product B. The N-nitroso-N-alkyl-$\beta$-alanine (B) is recovered from the water immiscible solvent by evaporation.

Since the nitrous acid is subject to air oxidation with formation of nitrogen dioxide, it is convenient to run the reaction in an inert atmosphere (for example nitrogen).

In a typical preparation one part by weight of the amine (A) is dissolved in 1–10 parts by weight of water (preferred 1.3–1.5 parts by weight). An equivalent amount of concentrated mineral acid is now added while chilling to maintain the temperature of 0–20°. The amine salt forms and remains in solution, for example, with hydrochloric acid.

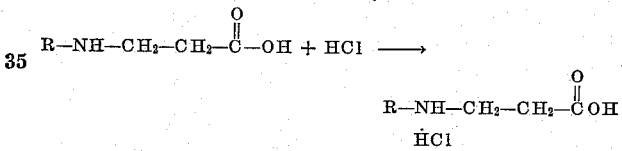

This solution is maintained at 0–40° (preferred temperature 0–10°) and an equivalent amount of solid sodium nitrite is added over a 0–30 minute period. The nitrosation is accompanied by an evolution of heat which is not always evident under the reaction conditions used. Occasionally an induction period of up to 1 hour is obtained before nitrosation commences. It will be advantageous if desired to use a slight stoichiometric excess of mineral acid as this tends to eliminate the induction period.

The reverse addition, involving dissolving the sodium nitrite and the amine (A) in water and adding the mineral acid to this mixed solution, also gives a good yield of the N-nitroso-N-alkyl-$\beta$-alanine (B).

These N-nitroso-N-alkyl-$\beta$-alanines (B), as described, frequently precipitate as yellow oils, under the concentrated reaction conditions. Several, however, notably N-nitroso-N-methyl-$\beta$-alanine and N-nitroso-N-(hydroxyethyl)-$\beta$-alanine are appreciably soluble in the aqueous phase and are isolated by continuous extraction with an immiscible organic phase, for example methylene chloride.

The N-nitroso-N-alkyl-$\beta$-alanines (B) are most generally yellow oils. They are soluble in numerous organic solvents (for example ethyl ether, methylene chloride, benzene, ethyl alcohol) as well as water. They are insoluble in petroleum ether. These compounds cannot be distilled at conventional vacuum pressures (for example 0.5 to 10 mm. Hg) as extensive decomposition occurs.

The N-nitroso-N-alkyl-$\beta$-alanine esters (compound D) and N-nitroso-N-alkyl-$\beta$-alanine thiol esters (compound F) are prepared according to reactions II and III above.

The source of nitrous acid is once again sodium (or potassium) nitrite and a mineral acid. The solvent can be water, a lower alcohol, acetic acid, or a mixture of solvents (methylene chloride/water, ethyl ether/water, alcohol-water, etc.). A convenient method is to mix the amine (compounds C or E) with water and add an equivalent amount of mineral acid while chilling to maintain the temperature in the range 0–30° (preferred 0–10°). The starting amine (compound C or E) may be water soluble or water insoluble. The amine salt formed from the mineral acid generally will be water soluble, viz.:

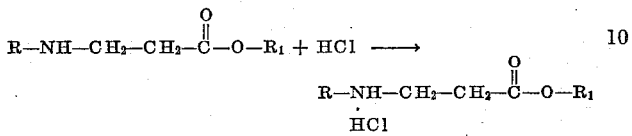

An equivalent amount of solid sodium nitrite is added. Nitrous acid is formed and nitrosation takes place.

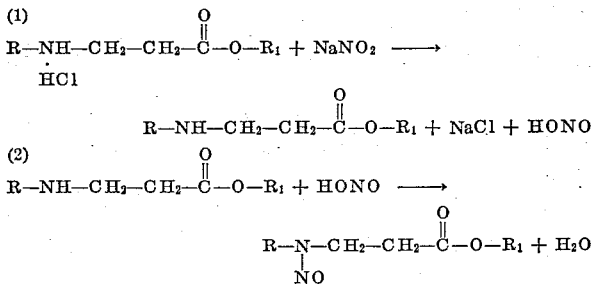

The reaction is mildly exothermic. The temperature is maintained at 0–30° (preferred temperature 0–10°) during the addition of the sodium nitrite which may take 1–20 minutes. A precipitation of —N—NO compound generally takes place by the time nitrosation is completed or generally within 1 hour thereafter. The N—NO product is usually a yellow oil but in some instances is a yellow-white crystalline solid. The N-nitroso-N-alkyl-β-alanine esters (compounds D) and the N-nitroso-N-alkyl-β-alanine thiol esters (compounds F) are soluble in water immiscible organic solvents such as methylene chloride, ethyl ether, benzene. It is convenient to isolate these products from the reaction mixture by extracting them with methylene chloride and evaporating the organic solvent. These esters are generally distillable yellow liquids so that vacuum distillation is employed to isolate them in the pure state.

In an alternative procedure to those shown above, type A amines can be prepared by the reaction of primary aliphatic amines with beta-propiolactone [T. L. Gresham, J. Am. Chem. Soc. 73, 3168 (1951)].

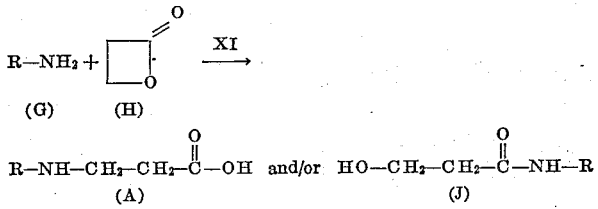

This reaction frequently leads to mixtures of A and J. The N-alkyl-beta-alanines (compounds A) are frequently oils which cannot be purified by recrystallization. Where these N-alkyl-β-alanines can be purified by recrystallization, notably N-ethyl-β-alanine, mixtures of dimethylformamide and ethanol or dimethylformamide and water are extremely useful for recrystallizing purposes. The contamination, presumably N-ethylhydracrylamide (a compound of the type J), is removed thereby. Nitrosation of somewhat impure N-alkyl-β-alanines leads to mixtures with the desired N-nitroso-N-alkyl-β-alanine as the major compound. The nature of the mixture is elucidated by a combination of elemental analysis, infrared analysis, and titration analysis. The oily N-nitroso-N-alkyl-β-alanines all show a common characteristic infrared spectrum in the 2.9–4.5, 5.8–5.9, and 6.8–9.7μ regions as follows:

| Wave length: | Nature of bands |
|---|---|
| 2.9–4.5μ | Heavy sagging band with peak at 3.5μ. Inflection at 3.9μ. |
| 5.8–5.9μ | Sharp carbonyl peak. |
| 6.0–9.7μ | Numerous sharp bands. (6.2–6.4, 6.8, 7.0–7.2, 7.5, 7.7, 8.2–8.5, 9.2–9.7.) |

The crystalline N-nitroso-N-alkyl-β-alanines show a very similar spectrum with two notable differences: The band at 3.5μ is much sharper (less of a sag). The bands in the 6.9–9.7μ region are more sharply defined.

This characteristic infrared spectrum of the pure oily N-alkyl-N-nitroso-β-alanines make possible the identification of N-alkyl-N-nitroso-β-alanines (major component) in the presence of contaminants (such as N-alkyl-hydracrylamides). The percentage of N-nitroso-N-alkyl-β-alanine is conveniently determined by titration.

It should be noted that the infrared spectrum of N-nitroso compounds has been described in the literature (J. Chem. Soc. 691, 1954) and bands at 7.1–7.4, 8.0, and 9.5μ attributed to the N—NO function.

The N-nitroso-N-alkyl-β-aminopropionitriles and the corresponding N-nitroso-N-alkyl-β-aminopropionic acid amides are prepared from amines E′ and E″ according to reaction III′ and III″ above.

The compounds of this invention have outstanding utility as plant growth control agents. They control the flowering and fruiting of a wide variety of plants, both broadleaves and grasses including for example, alfalfa, clover, beans, tobacco, marigold, chrysanthemum, buckwheat, crabgrass, bluegrass and other forage grasses, and fruit trees.

These compounds exert plant growth retardant action on ornamental shrubs (forsythia, yews, privet, for example), grasses (such as bluegrass, bentgrass, fescue, quackgrass, Johnsongrass, wild oats, Bermudagrass, ryegrass, and foxtail), and broadleaf plants (for example, chickweed, mustard, bindweed, zinnia, and numerous leguminous plants).

Axillary stimulation is initiated on ornamental shrubs. A most unusual effect is their ability to inhibit or prevent the dominance of the upper axillary bud on tobacco plants after tobacco has been topped (terminal bud removed).

An especially important advantage of this invention is the stimulation of stooling or tillering, i.e., increased number of growth stems from one root stock on desirable grass and small grain species. Important results therefore from treatment with the present compounds are the retardation of grass growth with reduction in mowings and the creation of a thicker, more desirable turf.

The compounds of this invention can be applied as preemergence or post-emergence applications, soil drenches, or they can be mixed intimately with the soil. Rates of application will usually be in the range of 0.25 to 16 pounds per acre. However, when these materials are mixed well with the soil, use rates can be higher.

The compound can be applied in any of a variety of compositions. Thus, those that are sufficiently water soluble can be applied simply in water solution. It is preferred, however, that the compounds be extended with a carrier material or conditioning agent.

Particularly beneficial plant growth regulant compositions are those of the following novel and useful compositions:

(1) From 25 to 97% by weight of at least one compound of this invention in admixture with from 3 to 75% by weight of inert solid powder having an average particle size below about 50 microns;

(2) From 0.5 to 50% by weight of at least one compound of this invention in an emulsifiable oil; and (3) From 5 to 90% by weight of at least one compound of this invention with up to about 15% by weight of a surface active agent.

In general, useful compositions utilizing the compounds of this invention can be made by convenient formulation with a carrier or conditioning agent commonly referred to in the art as a pesticidal adjuvant or modifier. Such compositions include water soluble powders, wettable powders (applied in water as an oil paste), emulsifiable oils, and water soluble formulations and other agriculturally useful formulations.

Usually from about 1 to 95% the active growth controlling compound is included in such formulations.

Solid formulations can be prepared with inert powders. The formulations thus can homogeneous powders that either can be used as such, diluted with inert solids to form dusts, or suspended in a suitable liquid medium for spray application. The powders usually comprise active ingredient admixed with minor amounts of conditioning agent. Natural clays (either absorptive such as attapulgite or relatively non-absorptive such as china clay), diatomaceous earth, walnut shell flour, redwood flour, synthetic fine silica, calcium silicate and other inert solid carriers of the kind conventionally employed in powder fungicidal compositions can be used. The active ingredient usually makes up from about 25–97% of these powders compositions. The solids ordinarily are very finely divided and have a particle size below about 50 microns and preferably below about 20 microns. For conversion of the powders to dusts talc, pyrophyllite, tobacco dust, volcanic ash and other dense, rapid-settling inert solids customarily are used.

If the active compound used is water soluble, it can be sprayed onto or in any other desired manner applied to an absorptive powder, or granules made from such powders, which can then be dried to produce a dry product. Any of the above absorptive materials can be used for the preparation of such products.

Liquid compositions including the active compounds above described can be prepared by admixing the compound with a suitable liquid diluent medium. The active compound can be either in solution or in suspension in the liquid medium. Typical of the liquid media commonly employed are kerosene, Stoddard solvent, xylene, alkylated naphthalene, glycols and ketones such as diisobutyl ketone, cyclohexanone, etc. The active ingredient usually makes up from about 0.5 to 50% of these liquid compositions. Some of these compositions are designed to be used as such, and others to be extended with large quantities of water.

Compositions in the form of wettable powders or liquids can also include one or more surface-active agents such as wetting, dispersing or emulsifying agents. Thus, mixtures of the above liquids with the active compounds can contain an emulsifying agent to make an emulsifiable oil composition. The surface-active agents cause the liquid or dry compositions to disperse or emulsify easily in water to give aqueous sprays.

The surface-active agents employed can be of the cationic, or preferably the anionic or nonionic type. They include, for example, sodium oleate, sulfonated petroleum oils, alkyl aryl sulfonates, sodium lauryl sulfate, polyethylene oxides, lignin sulfonates, and other surface-active agents. A detailed list of such agents is set forth in a book by John W. McCutcheon, Inc., "Detergents and Emulsifiers—Up to Date" (1962) and Bulletin E–607 of the Bureau of Entomology and Plant Quarantine of the U.S. Department of Agriculture.

The compounds can be applied in compositions of the type shown in Jones U.S. Patent 2,412,510 in which an active compound of the invention replaces the active materials of that patent in the composition shown and in like amounts. Similarly, any of the carriers, additives or surface-active agents there named or referred to can be used. The entire disclosure of the aforesaid Jones patent is hereby incorporated herein.

In order that the invention may be better understood, the following illustrative examples are given in addition to those above. All percentages are by weight unless otherwise indicated.

Example 1

STEP 1

To a solution of 72 parts by weight of $\beta$-propiolactone in 500 parts by weight of acetonitrile is added 45.2 parts by weight of ethyl amine over a period of ½ hour. The reaction is exothermic and cooling is required to maintain the temperature at 22–33°. A heavy white precipitation occurs during the course of the addition. For ½ hour after completing the addition the reaction mixture continues to evolve heat. Thereafter no further heat evolution is noted and the reaction mixture is stirred at room temperature for 20 hours. The white crystalline product is filtered, washed with acetonitrile, and dried. The yield is 108 parts by weight, M.P. 162–166°. This product is stirred with 980 parts by weight of N,N-dimethylformamide at 70–90° while 100 parts by weight of ethyl alcohol is added. A clear solution is obtained. On cooling essentially pure N-ethyl-$\beta$-alanine separates out as white crystals. These are filtered, washed with dimethyl formamide/ethanol, and dried. The yield is 82 parts by weight, M.P. 174–176°.

*Analysis.*—$C_5H_{11}NO_2$: C, 51.3; H, 9.46; N, 12.0. Found: C, 50.39; H, 9.26; N, 11.78.

STEP 2

To 10.0 parts by weight of N-ethyl-$\beta$-alanine in 15 parts by weight of water is added 8.8 parts by weight of concentrated hydrochloric acid while chilling to maintain temperature at 10–17°. Now 5.9 parts by weight of solid sodium nitrite is added portionwise over a 23-minute period while chilling to maintain temperature at 4–8°. The reaction mixture turns lime green and becomes turbid. The reaction mixture is now allowed to come to room temperature and stirred for twenty hours. A good yield of yellow oil forms during this period. The yellow oil is taken up in 40 parts by weight of methylene chloride. Evaporation of the methylene chloride solution gives essentially pure N-nitroso-N-ethyl-$\beta$-alanine as a yellow oil. The yield is 9.8 parts by weight.

*Analysis.*—$C_5H_{10}N_2O_3$: C, 41.1; H, 6.89; N, 19.2. Found: C, 41.28; H, 7.10; N, 18.60.

This oily N-nitroso-N-ethyl-$\beta$-alanine shows the following infrared peaks:

| | |
|---|---|
| 2.9–4.5$\mu$ | Heavy sagging band with peaks at 3.4 and shoulder at 3.9. |
| 5.8$\mu$ | Strong band. |
| 6.95$\mu$, 7.2$\mu$, 7.5$\mu$, 8.2$\mu$ | Series of peaks not sharply differentiated. |
| 9.3$\mu$ | Sharp peak. |

This compound is formulated into a water soluble formulation according to the following recipe:

| | Percent |
|---|---|
| N-nitroso-N-ethyl-$\beta$-alanine | 25 |
| Alkyl naphthalene sulfonic acid, Na salt | 0.5 |
| Sodium lignin sulfonate | 1.0 |
| Attapulgite clay | 73.5 |

The above components are combined by first blending the surfactants and the clay and then spraying in the liquid, active material while blending. This is followed by micropulverizing to deagglomerate any wet lumps which may have formed, and reblending.

Four to 8 pounds of this formulation is added to 100 gallons of water and applied to ornamentals (for example, yews, forsythia, and privet) that have reached the desired size. The plants are sprayed to the point of run-off with this spray. The treatment greatly retards new growth and greatly reduces the trimming necessary to maintain these plants at the size desired. One to two such treatments per year maintains the ornamentals at the desired size.

Example 2

STEP 1

To a solution of 72 parts by weight of β-propiolactone in 500 parts by weight of acetonitrile is added gradually 31 parts by weight of methylamine. The addition takes 1 hour. The reaction is markedly exothermic and is maintained at 24–32° with cooling. During the addition a white syrup precipitates. Following the addition the reaction mixture shows little or no further tendency to heat up. The heavy white syrup is present as a lower phase. The acetonitrile upper phase is decanted off. The sticky white syrup is washed with acetonitrile. This syrup is readily water soluble. It is a mixture of N-methyl-β-alanine and presumably N-methyl-hydracrylamide.

STEP 2

To 102 parts by weight of the white syrup dissolved in 110 parts by weight of water is added 99 parts by weight of concentrated hydrochloric acid while chilling to keep the reaction mixture at 20–30°. To this solution is added 69 parts by weight of solid sodium nitrile while chilling to maintain the temperature at 4–11°. The addition takes 20 minutes during which time the reaction mixtures become green colored. This reaction mixture is stirred for 20 hours. During this time the color changes from green to yellow. No precipitate forms. This aqueous solution is now exhaustively extracted with methylene chloride in a continuous liquid-liquid extractor. Evaporation of the methylene chloride extract yields 22 parts by weight of a yellow oil.

*Analysis.*—$C_4H_8N_2O_3$: C, 35.6; H, 6.09; N, 21.2; Cl, nil; Neut. equiv., 132.1. Found: C, 38.6; H, 6.32; N, 19.02; Cl, 0.34; Neut. equiv., 149.

This reaction product is now formulated according to the following:

| | Percent |
|---|---|
| N-nitroso-N-methyl-β-alanine | 50 |
| Methyl Cellosolve | 47 |
| Isooctyl phenyl polyethoxy ethanol | 3 |

The above liquid composition is prepared by simple mixing of the components. Upon dilution to use levels with water all components are soluble.

One to two pounds (active) of this material is dissolved in 60 gallons of water and sprayed on an acre of alfalfa, red clover, and ladino clover mixture before flower primodia are visible (when the crop is 6–10 inches tall). This treatment delays and often prevents flowering and seed production by the crop, thus allowing more vegetative growth. With this treatment, the yield of high quality forage is increased.

Example 3

14.6 parts by weight of N-nitroso-N-ethyl-β-alanine is stirred with 100 parts by weight of water to give an opaque lime-green solution. To this is added a solution of 4.0 parts by weight of sodium hydroxide in 40 parts by weight of water while cooling to maintain the temperature at 23–29°. Vacuum evaporation of the water solution yields 16.8 parts by weight of essentially pure N-nitroso-N-ethyl-β-alanine sodium salt. This product melts over the range 194–198°.

*Analysis.*—$C_5H_9N_2O_3Na$: C, 35.7; H, 5.40; N, 16.7; Na, 13.7; Neut. equiv., 168.1. Found: C, 35.73; H, 5.68; N, 16.9; Na, 13.5; Neut. equiv., 168.

This material is formulated as follows:

| | Percent |
|---|---|
| N-nitroso-N-ethyl-β-alanine sodium salt | 4 |
| 15–30 mesh granular "Attaclay" | 96 |

This product is prepared by spraying a concentrated aqueous solution of the active material upon granular "Attaclay" while tumbling the latter, then drying.

One hundred twenty-five pounds per acre of the granular formulation is applied to bluegrass turf with a lawn spreader prior to the emergence of crabgrass. Crabgrass is retarded markedly. Fescue, bentgrass and bluegrass show marked retardation of foliage growth. This reduces the number of mowings during the growing season.

Example 4

24.7 parts by weight of N-ethyl-β-alanine methyl ester is stirred with 40 parts by weight of water to give a clear solution. To this is added 19 parts by weight of concentrated hydrochloric acid while cooling to maintain the temperature at 10–22°. Now 13.0 parts by weight of solid sodium nitrite is added over a 2–3 minute period while chilling to kep the reaction mixture at 2–7°. An immediate oily precipitate forms. The reaction mixture is now stirred for 1 hour during which time it is allowed to come to room temperature. During this time the amount of yellow oil increases noticeably. The yellow oil is now taken up in methylene chloride. Evaporation of the methylene chloride solution yields 22 parts by weight of yellow oil. This oil is distilled in vacuo. The pure fraction distilling at 102–104°/0.8 mm. amounts to 16 grams. This is N-nitroso-N-ethyl-β-alanine methyl ester, a yellow oil. It is formulated and used as follows:

| | Percent |
|---|---|
| N-nitroso-N-ethyl-β-alanine methyl ester | 25 |
| Polyoxyethylene sorbitan mono ester of tall oil acids | 5 |
| Xylene | 70 |

This emulsifiable oil formulation is mixed with 100 gallons of water per acre and applied at the rate of 6 pounds per acre with a truck-mounted sprayer to newly mowed grass growing along a roadside. From 20 to 60% growth retardation of the grasses (Johnson grass, Bermuda grass, ryegrass, crabgrass, foxtail, millet, fescue, and bluegrass) is noted and the number of mowings per season is markedly reduced.

Example 5

41 parts by weight of N-methyl-3-amino-thiolpropionic acid methyl ester is stirred with a mixture of 60 parts by weight of methyl alcohol and 22.0 parts by weight of sodium nitrite while adding gradually 23.4 parts by weight of concentrated hydrochloric acid. Chilling maintains the reaction temperature at 0–10° during the 15-minute addition period. The reaction mixture assumes a green and then a yellow color. After 2 hours stirring the reaction mixture is vacuum concentrated to a mixture of inorganic solids and yellow organic oil. This residue is taken up in methylene chloride and filtered. Evaporation of the methylene chloride solution gives the essentially pure yellow oil, N-nitroso-N-methyl-3-amino-thiolpropionic acid methyl ester. It is formulated according to the following recipe:

| | Percent |
|---|---|
| N-nitroso-N-methyl-3-amino-thiolpropionic acid methyl ester | 35 |
| Polyoxyethylene lauryl ether | 3 |
| Synthetic fine silica | 62 |

The surfactant is first mixed with the liquid active material then this mixture is sprayed upon the silica while blending. This is followed by micropulverizing and reblending to assure uniform distribution.

One-quarter to one-half gram of this material is first mixed with 50 grams of fine sand, then this sand-chemical mixture is thoroughly dispersed in a cubic foot of greenhouse potting soil. Chrysanthemums and poinsettias are planted in this mix. The plants grown in this treated soil are shorter and more desirable for potted plants.

Example 6

N-nitroso-N-ethyl-β-alanine sodium salt is formulated on "Attaclay" as an 80% compound: 20% "Attaclay"

mix and then used on tobacco to prevent terminal bud dominance and on beans to reduce flowering.

The water-soluble formulation is applied in 60 gallons of water at the rate of 1 pound (active) per acre to tobacco plants immediately after toping. The axillary buds extend and grow vigorously in the axils of all the tobacco leaves. This is unusual since the terminal axillary bud usually becomes dominant and prevents vigorous growth of the other axillary buds.

When this formulation is applied in 60 gallons of water to Black Valentine beans (first trifoliate leaf expanding) at the rate of 0.25 pound (active) per acre, flower production is reduced by as much as 45% to 65%. Plants are markedly shortened in height as compared to untreated plants.

*Examples 7 and 8*

N-nitroso-N-ethyl-β-alanine ethyl ester and N-nitroso-N-ethyl-β-alanine isopropyl ester are prepared according to the procedures of Example 4 by substituting appropriate amounts of N-ethyl-β-alanine ethyl ester and N-ethyl-β-alanine isopropyl ester for the 24.7 parts by weight of N-ethyl-β-alanine methyl ester of Example 4.

| Example | N-ethyl-β-alanine reactant, and parts by weight | Product | Physical props. |
|---|---|---|---|
| 7 | N-ethyl-β-alanine ethyl ester, 27.3 parts by weight. | N-nitroso-N-ethyl-β-alanine ethyl ester. | Yellow liquid, B.P. 80–82° C./ 0.5 mm. $n_D^{25}$ =1.4509. |
| 8 | N-ethyl-β-alanine isopropyl ester, 30.0 parts by weight. | N-nitroso-N-ethyl-β-alanine isopropyl ester. | Yellow liquid B.P. 88–90° C./ 0.5 mm. $n_D^{25}$ =1.4473. |

These product compounds can be formulated and used as emulsifiable oils according to Example 4 or as sand-chemical mixes according to Example 5. The emulsifiable oils when mixed with water and applied at 6–10 lb./acre are active in retarding grasses. The sand-chemical mixes when mixed with potting soil inhibit "leginess" of chrysanthemums and poinsettias, and other plants.

*Examples 9 and 10*

N-nitroso-N-(n-propyl)-β-alanine and N-nitroso-N-allyl-β-alanine are prepared according to the general procedures of Examples 1 and 2.

EXAMPLE 9

40 parts by weight of β-propiolactone in 234 parts by weight of acetonitrile is reacted with 32.9 parts by weight n-propylamine. A viscous organic oil separates. It is separated and washed with acetonitrile. This organic oil contains some dissolved acetonitrile After this solvent is removed under vacuum, the viscous yellow syrupy product amounts to 64.9 parts by weight. Titration analysis indicates it consists of 67% N-isopropyl-β-alanine and 23% N-isopropylhydracrylamide.

43.1 parts by weight of this syrupy product is dissolved in water. 34.2 parts of concentrated hydrochloric acid is added followed by 23.5 parts by weight of sodium nitrite. A yellow oil forms. It is isolated and the yield is 21.0 grams.

*Theory.*—N, 17.5%; Neut. equiv., 160. Found: N, 16.43, 16.52; Neut. equiv., 180.

The data indicate that the product consists of 88% N-nitroso-N-(n-propyl)-β-alanine and 12% of a neutral impurity.

This yellow oily product can be formulated and used according to the procedures of Example 1.

EXAMPLE 10

55.7 parts by weight of β-propiolactone in 313 parts by weight of acetonitrile is reacted with 44.1 parts by weight of allylamine. A white gummy precipitate forms. This precipitate crystallizes from 131 parts by weight of dimethylformamide and 23 parts by weight of water.

The product is 20 parts by weight of essentially pure N-allyl-β-alanine, M.P. 142–147°, a white crystalline solid.

|  | Neut. equiv. |
|---|---|
| Theory for $C_6H_{11}NO_2$ | 129 |
| Found | 130 |

18.5 parts by weight of the N-allyl-β-alanine is dissolved in 50 parts by weight of water. 15.1 parts by weight of concentrated hydrochloric acid is added followed by 10.1 parts by weight of sodium nitrite. A yellow oil precipitates and is isolated. The yield is 19.4 grams.

|  | Neut. equiv. |
|---|---|
| Theory for $C_6H_{10}N_2O_3$ | 158 |
| Found | 167 |

The titration analysis shows that the product is 88% N-nitroso-N-allyl-β-alanine mixed with 12% of a neutral impurity. This material can be formulated and used according to the procedures of Example 1.

*Examples 11–16*

The following N-nitroso-N-alkyl-β-alanine salts are prepared according to the procedures of Example 3 by substituting the N-alkyl-β-alanine (and its parts by weight) in the table for the 14.6 parts by weight of N-ethyl-β-alanine used in Example 3 and by substituting the base (and its parts by weight) for the 4.0 parts by weight of sodium hydroxide used in Example 3.

TABLE I

| Example No. | N-nitroso-N-alkyl-β-alanine | Base | Product |
|---|---|---|---|
| 11 | N-nitroso-N-ethyl-β-alanine (14.6 parts). | Dimethylamine (4.50 parts). | N-nitroso-N-ethyl-β-alanine dimethyl amine salt. |
| 12 | N-nitroso-N-methyl-β-alanine (13.2 parts). | Tributylamine (18.5 parts). | N-nitroso-N-methyl-β-alanine tributyl-amine salt. |
| 13 | N-nitroso-N-(n-propyl)-β-alanine (15.5 parts). | Ethylamine (4.5 parts). | N-nitroso-N-(n-propyl)-β-alanine ethyl-amine salt. |
| 14 | N-nitroso-N-allyl-β-alanine (15.3 parts). | Ammonia (1.70 parts). | N-nitroso-N-allyl-β-alanine ammonium salt. |
| 15 | N-nitroso-N-ethyl-β-alanine (14.6 parts). | Barium hydroxide·8H₂O (31.5 parts). | N-nitroso-N-ethyl-β-alanine barium salt. |
| 16 | N-nitroso-N-methyl-β-alanine (13.2 parts). | Ethoxyethyl-amine (8.91 parts). | N-nitroso-N-methyl-β-alanine ethoxyethyl-amine salt. |
| 17 | N-nitroso-N-ethyl-β-alanine (14.6 parts). | Ethanolamine (6.1 parts). | N-nitroso-N-ethyl-β-alanine, ethnaolamine salt. |
| 18 | do | N-methyl-ethanolamine (7.5 parts). | N-nitroso-N-ethyl-β-alanine salt with N-methyl-ethanolamine. |

These N-nitroso-N-alkyl-β-alanine salts of Examples 11–18 can be formulated and used as in Examples 3 and 6.

*Examples 19–21*

The following N-nitroso-N-alkyl-β-alanine esters are prepared according to the procedures of Example 4 by substituting the N-alkyl-β-alanine ester (and its parts by weight) for the 24.7 parts by weight of N-ethyl-β-alanine methyl ester used in Example 4.

TABLE II

| Example No. | N-alkyl-β-alanine ester | N-nitroso-N-alkyl-β-alanine ester |
|---|---|---|
| 19 | N-methyl-β-alanine methyl ester (22.0 parts). | N-nitroso-N-methyl-β-alanine methyl ester. |
| 20 | N-ethyl-β-alanine isobutyl ester (32.6 parts). | N-nitroso-N-ethyl-β-alanine isobutyl ester. |
| 21 | N-methyl-β-alanine hexyl ester (35.2 parts). | N-nitroso-N-methyl-β-alanine hexyl ester. |

15

These N-nitroso-N-alkyl-β-alanine esters are formulated and used according to the procedures of Examples 1, 4 and 5.

Examples 22–24

The following N-nitroso-N-alkyl-β-aminothiolpropionic acid esters are prepared according to the methods of Example 5 by substituting the N-alkyl-β-aminothiolpropionic acid esters and their parts by weight for the 41 parts by weight of N-methyl-3-aminothiolpropionic acid methyl ester of Example 5.

TABLE III

| Example No. | N-alkyl-β-aminothiol-propionic acid ester | N-nitroso-N-alkyl-β-aminothiolpropionic acid ester |
|---|---|---|
| 22 | N-ethyl-β-aminothiol-propionic acid ethyl ester (49.8 parts). | N-nitroso-N-ethyl-β-aminothiolpropionic acid ethyl ester. |
| 23 | N-methyl-β-aminothiolpropionic acid hexyl ester (62.5 parts). | N-nitroso-N-methyl-β-aminothiolpropionic acid hexyl ester. |
| 24 | N-propargyl-β-aminothiolpropionic acid isopropyl ester (57.1 parts). | N-nitroso-N-propargyl-β-aminothiolpropionic acid isopropyl ester. |

These N-nitroso-N-alkyl-β-aminothiolpropionic esters of Examples 22–24 can be formulated and used as described in Examples 4 and 5.

Example 25

N-nitroso-N-ethyl-β-alanine, sodium salt, is applied at the rate of 4 pounds (active) per acre in 60 gallons of water to young barley plants (5 weeks after seedling or in late winter or early spring when vigorous growth begins). Within three to four weeks after treatment, the barley plants show an increase of 2 to 4 times the number of tillers (upright stems) as compared to untreated plants. This is especially beneficial when a poor stand of barley is obtained and it is desirable to increase the number of tillers per acre. Similar results are obtained on wheat, oats and rye.

In the case of turf and roadside grasses, 4 pounds of active ingredient per acre applied during the growing season retards the growth of foliage and decreases the number of required mowings per season. Further, this treatment increases the tillering of bluegrass, bentgrass, fescues, Johnson grass, and other turf and roadside grasses. This results in a thicker stand of grass and give a more pleasing appearance to the viewer.

Example 26

To a solution of 1273 g. (13 mol) of β-ethylaminopropionitrile in 1800 ml. of water is added 1250 ml. (15 mol) of concentrated HCl with cooling. The solution is blanketed with a stream of $N_2$ and is cooled to about 10° C. Solid $NaNO_2$ (1036 g.; 15 m.) is added slowly in portions, each portion being added as the foam subsides from the previous addition. The mixture is stirred for a further period of 2 hours. One liter of methylene chloride is added and the lower organic layer is separated. The aqueous phase is extracted twice with 250 ml. of methylene chloride. The combined methylene chloride solutions are washed once with 250 ml. of saturated NaCl solutions. The methylene chloride is removed by distillation at atmospheric pressure and finally under reduced pressure at temperatures not greater than 45° C. Finally, a small residual water content is removed at about 1 mm. Hg. and 45° C. The compound produced is N-nitroso-N-ethyl-β-aminopropionitrile. Yield 1636 g. (99%) yellow, semi-viscous oil; $n_D^{25}$ 1.4660; percent N, 32.77% (Dumas), theory 3311%.

The compound made above is formulated as follows:

| | Percent |
|---|---|
| N-nitroso-N-ethyl-β-aminopropionitrile | 25.0 |
| Dioctylsodium sulfosuccinate | 0.3 |
| Partially desulfonated sodium lignin sulfonate | 1.0 |
| Attapulgite clay | 73.7 |

16

The above wettable powder is prepared by blending the components together, then micropulverizing to deagglomerate lumps and extend the liquid active material over the surface of the clay.

This formulation is applied at the rate of 4 to 8 pounds in 100 gallons of water to ornamentals to run-off. Such ornamentals as yews, forsythia and privet show reduced growth. This reduces the amount of trimming needed to keep these plants at a desirable size.

Example 27

A solution of 115 parts by weight of 3-(2-hydroxyethylamino)propionitrile in 150 parts by weight of water is neutralized with concentrated hydrochloric acid. Sixty-nine parts by weight of $NaNO_2$ is added slowly at a temperature of 10–20° C. over a period of 40 minutes with a nitrogen blanket over the reaction mixture. After stirring for 5 hours at 25° C. the mixture is extracted with five successive 100 parts by weight portions of methylene chloride. The combined extracts are washed with 75 parts by weight of saturated NaCl solution. Solvent and residual water is removed under reduced pressure at 45° C. bath temperature. The compound produced is N-nitroso-N-(2-hydroxyethyl)-β-aminopropionitrile. Yield 129 parts by weight (90%).

*Analysis.*—Percent N (Dumas), 29.0; theory 29.4.

The compound made above is formulated as follows:

| | Percent |
|---|---|
| N-nitroso-N-(2-hydroxyethyl)-β-aminopropionitrile | 25 |
| Blend of polyoxyethylene ethers and oil soluble sulfonates | 5 |
| Xylene | 70 |

The above mutually soluble components are mixed together to form a homogeneous emulsifiable solution.

An application of 6 to 10 pounds of active ingredient per acre of this material in 80 gallons of water gives excellent retardation of crabgrass, chickweed and wild oats growing around loading platforms.

Example 28

One hundred sixteen parts by weight of 3-ethylaminopropionamide is neutralized with hydrochloric acid in essentially the same manner as in Example 27. Sixty-nine parts by weight of $NaNO_2$ is added in small portions over a period of two hours. Nitrosation of the amido group is avoided by maintaining the temperature at 5–10° C. The product is extracted with ether. The ether solution is washed with saturated NaCl solution and the solvent and residual water removed under reduced pressure. The compound produced is N-nitroso-N-ethyl-β-aminopropionamide. Product: yellow oil, 85% yield.

*Analysis.*—Percent N 29.2%; theory, 28.9%.

The compound produced is formulated as follows:

| | Percent |
|---|---|
| N-nitroso-N-ethyl-β-aminopropionamide | 50.0 |
| Nonyl phenol ethylene oxide adduct | 2.0 |
| Low viscosity methyl cellulose | 0.3 |
| Synthetic fine calcium silicate | 47.7 |

The above components are blended and micropulverized until substantially all particles are below 50 microns.

The above formulation is applied at the rate of 6–10 pounds of active ingredient in 100 gallons of water per acre to roadside grasses, which have been recently mowed. Subsequently, a marked reduction in rate of growth is noted on such grass species as Johnson grass, crabgrass, foxtail and bluegrass.

Example 29

| | Percent |
|---|---|
| N-nitroso-N-propyl-β-aminopropionamide | 10 |
| Ammonium sulfate | 90 |

The above components are ground together then moist granulated and dried to yield 15–60 mesh granules.

This formulation is applied at the rate of 4 to 8 pounds of active ingredient per acre with a granular applicator to a roadside area planted to Kentucky 31 fescue turf. This application when applied prior to germination of crabgrass and chickweed gives excellent retardation of these two plants.

*Examples 30–79*

The following compounds are each substituted one at a time for the N-nitroso-N-propyl-β-aminopropionamide of Example 29 in like amount by weight and are formulated and applied in like manner. Like results are obtained.

Example:
30. N-nitroso-N-methyl-β-alanine
31. N-nitroso-N-ethyl-β-alanine
32. N-nitroso-N-(n-propyl)-β-alanine
33. N-nitroso-N-allyl-β-alanine
34. N-nitroso-N-propargyl-β-alanine
35. N-nitroso-N-(2-chloroethyl)-β-alanine
36. N-nitroso-N-(2-hydroxyethyl)-β-alanine
37. N-nitroso-N-ethyl-3-amino-thiolpropionic acid
38. N-nitroso-N-methyl-β-alanine methyl ester
39. N-nitroso-N-ethyl-β-alanine ethyl ester
40. N-nitroso-N-(n-propyl)-β-alanine n-propyl ester
41. N-nitroso-N-methyl-β-alanine n-butyl ester
42. N-nitroso-N-ethyl-β-alanine amyl ester
43. N-nitroso-N-propyl-β-alanine hexyl ester
44. N-nitroso-N-ethyl-3-amino-thiolpropionic acid ethyl ester
45. N-nitroso-N-methyl-3-amino-thiolpropionic acid ethyl ester
46. N-nitroso-N-ethyl-β-alanine sodium salt
47. N-nitroso-N-ethyl-β-alanine N-methylammonium salt
48. N-nitroso-N-ethyl-β-alanine N,N-dimethyl-ammonium salt
49. N-nitroso-N-methyl-β-alanine N,N,N-trimethyl-ammonium salt
50. N-nitroso-N-ethyl-β-alanine barium salt
51. N-nitroso-N-ethyl-β-alanine ethoxyethylamine salt
52. N-nitroso-N-ethyl-β-alanine salt with N,N-dimethyl-β-butoxy ethylamine salt
53. N-nitroso-N-ethyl-3-amino-thiolpropionic acid sodium salt
54. N-nitroso-N-(2,3-dihydroxy-n-propyl)-β-alanine lithium salt
55. N-nitroso-N-methyl-β-alanine beryllium salt
56. N-nitroso-N-(3-iodoallyl)-β-alanine cesium salt
57. N-nitroso-N-trifluoromethyl-β-alanine N,N,N-tributylammonium salt
58. N-nitroso-N-ethyl-β-alanine N,N,N,N-tetrabutyl ammonium salt
59. N-nitroso-N-ethyl-β-alanine N,N,N,N-tetraethyl ammonium salt
60. N-nitroso-N-ethyl-β-alanine, N,N-di(β-ethanol) ammonium salt
61. N-nitroso-N-ethyl-β-alanine N,N,N-tri(β-ethanol)ammonium salt
62. N-nitroso-N-ethyl-β-alanine N,N-dimethyl-N-(β-ethanol)ammonium salt
63. N-nitroso-N-ethyl-β-alanine-N-methyl-N,N-di-(β-ethanol)ammonium salt
64. N-nitroso-N-ethyl-β-alanine, ethanolamine salt
65. N-nitroso-N-ethyl-β-alanine, N-methyl-ethyl-amine salt
66. N-nitroso-N-bromoethyl-β-aminopropionitrile
67. N-nitroso-N-ethyl-β-aminopropionitrile
68. N-nitroso-N-(propyl)-β-aminopropionitrile
69. N-nitroso-N-(2-hydroxyethyl)-β-amino propionitrile
70. N-nitroso-N-(3-chloropropyl)-β-amino-propionitrile
71. N-nitroso-N-methyl-β-aminopropionamide
72. N-nitroso-N-ethyl-β-aminopropionamide
73. N-nitroso-N-propyl-β-aminopropionamide
74. N-nitroso-N-(2-hydroxyethyl)-β-amino-propionamide
75. N-nitroso-N-(2-chloroethyl)-β-amino-propionamide
76. 2-hydroxyethylammonium salt of N-nitroso-N-ethyl-β-alanine
77. N'-methyl-(2-hydroxyethylammonium) salt of N-nitroso-N-ethyl-β-alanine
78. N',N'-dimethyl-(2-hydroxyethylammonium) salt of N-nitroso-N-ethyl-β-alanine
79. N'-methyl-(2-hydroxypropylammonium) salt of N-nitroso-N-ethyl-β-alanine

*Example 80*

A solution of 84 parts by weight of β-n-propylamino-propionitrile in 200 parts by weight of water is neutralized with an excess of concentrated hydrochloric acid (75 parts by weight). To the acidic solution maintained at 10–15° C. is added 63 parts by weight of solid NaNO$_2$ in portions while the reaction mixture is blanketed with N$_2$ to prevent the reaction of evolved NO with O$_2$ of the air. A second liquid phase appears as the NaNO$_2$ addition nears completion. The mixture is stirred overnight and the organic phase is separated, washed with 100 parts by weight of saturated NaCl solution and then dried under reduced pressure at 45° C. to produce a yellow oil. This compound is N-nitroso-N-propyl-β-amino-propionitrile. Yield 104 g., 99%, $n_D^{25}$ 1.4650, percent N (Dumas) 29.12%, theory 29.8%.

It will be readily understood by persons skilled in the art from a reading of the above exemplary disclosure that other products within the scope of this invention can be prepared and used in accordance with the teachings herein by simple substitution of appropriate materials in the above examples which are given for purposes of illustration only.

The invention claimed is:

1. A compound of the formula:

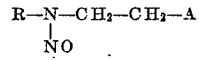

wherein

A is selected from the group consisting of

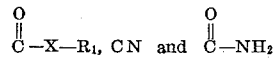

R is selected from the group consisting of an unsubstituted straight chain hydrocarbon radical of 1 through 3 carbons, a hydroxy substituted straight chain hydrocarbon radical of 1 through 3 carbons, a halogen substituted straight chain hydrocarbon radical of 1 through 3 carbons and with the limitation that R must be 2 through 3 carbon atoms when A is cyano;

X is selected from the group consisting of oxygen and sulfur and

R$_1$ is selected from the group consisting of hydrogen, alkyl of 1 through 6 carbons, alkali metal ion, alkaline earth metal ion, ammonium, mono-alkyl-ammonium, dialkylammonium, trialkylammonium, mono-, di-, and tri-alkanolammonium, monoalkanol-dialkylammonium, monoalkanol-monoalkylammonium, dialkanol-monoalkylammonium and tetra-alkyl-ammonium, where each alkyl is 1 through 4 carbons and each alkanol is 2 through 4 carbon atoms, mono(alkoxyalkyl)ammonium, di(alkoxyalkyl)ammonium, tri(alkoxyalkyl)ammonium, mono(alkoxyalkyl) alkylammonium, and di(alkoxyalkyl)alkylammonium where alkoxyalkyl is 1 through 6 carbons and alkylammonium is 1 through 4 carbons.

2. N-nitroso-N-ethyl-β-aminopropionitrile.
3. N-nitroso-N-ethyl-β-aminopropionamide.
4. N-nitroso-N-ethyl-β-alanine.

5. N-nitroso-N-ethyl-β-alanine, N,N-dimethyl ammonium salt.

References Cited by the Examiner

UNITED STATES PATENTS

| | | | |
|---|---|---|---|
| 2,852,553 | 9/1958 | D'Amico et al. | 260—471 |
| 2,892,696 | 6/1959 | Barrons | 71—2.7 |
| 3,009,854 | 11/1961 | Russell | 260—482 X |
| 3,031,492 | 4/1962 | Frankel et al. | 260—482 |
| 3,054,667 | 9/1962 | Josephs | 71—2.7 |
| 3,068,274 | 12/1962 | McCall | 260—465.5 |
| 3,096,362 | 7/1963 | Sexton | 260—465.5 |

OTHER REFERENCES

Kissinger et al.; C.A., 53 (1959), p. 15968e.
Tafel et al., C.A., 3 (1909), pp. 2950–51.

LORRAINE A. WEINBERGER, *Primary Examiner.*

JULIAN S. LEVITT, CHARLES B. PARKER, *Examiners.*